United States Patent [19]

Calvin

[11] Patent Number: 4,652,864

[45] Date of Patent: Mar. 24, 1987

[54] MICROWAVE PROXIMITY SENSOR

[76] Inventor: Noel M. Calvin, 245 Old Spanish Trail, Portola Valley, Calif. 94025

[21] Appl. No.: 401,925

[22] Filed: Jul. 26, 1982

[51] Int. Cl.[4] .............................................. G08B 13/18
[52] U.S. Cl. .................................................... 340/553
[58] Field of Search ................. 102/211; 340/562, 552, 340/553; 343/5 PD

[56] References Cited

U.S. PATENT DOCUMENTS 4,144,529  3/1979  Miller et al. ........................ 340/562
4,366,473  12/1982  Inoue et al. .......................... 340/562

OTHER PUBLICATIONS

The A.R.R.L. Antenna Book, American Radio Relay League, 1960, 9th edition, pp. 113–115.

Primary Examiner—Theodore M. Blum
Attorney, Agent, or Firm—Herzig & Yanny

[57] ABSTRACT

Microwave oscillator means wherein the resonant frequency determining element is a ½ or ¼-wavelength folded dipole antenna that also serves as the transmitting and receiving antenna, capacitor means that is alternately charged and then discharged through said oscillator means until the voltage drops so low that oscillation ceases at which point the capacitor is charged again, negative peak follower means to convert the minimum voltage across the capacitor into a DC voltage, and comparator means to detect changes in the output voltage of the peak follower caused by the approach of a person or object to the ½ or ¼-wavelength antenna.

7 Claims, 3 Drawing Figures

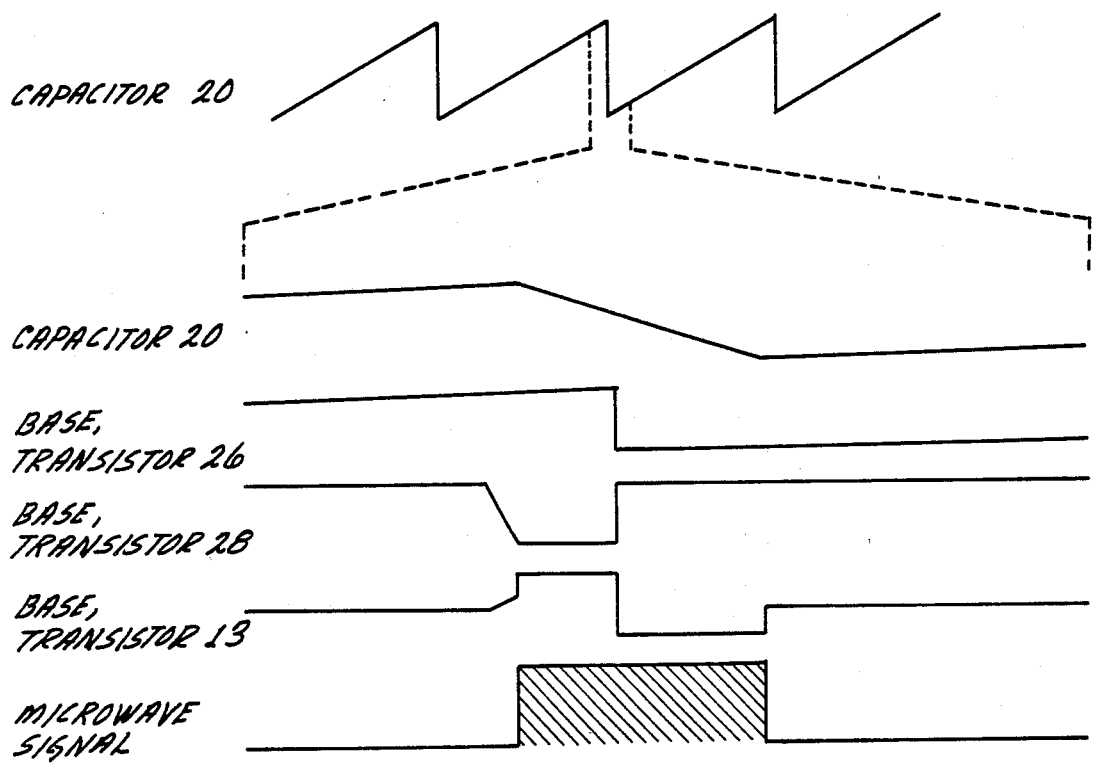

MICROWAVE PROXIMITY SENSOR

BACKGROUND AND PRIOR ART

There exists a wide variety of devices, generically referred to as Microwave Proximity Sensors, which are capable of detecting the presence or movement of an object at a distance. These devices are all responsive to changes in the standing wave pattern surrounding a microwave source caused by interference between microwaves reflected from an object and the directly radiated signal.

The size and complexity of such sensors vary widely depending upon the requirements for range and precision. On the one hand, radar sets have ranges exceeding 1000 miles and are able to track numerous targets simultaneously and determine the range and azimuth of each one. On the other hand, small sensors intended as intrusion detectors for burglar alarm systems, have a maximum range of perhaps 100 feet and limited capability for determining range or direction.

The longer range sensors generally employ vacuum tube type microwave oscillators such as the Klystron or Magnetron, coupled to highly directional transmitting antennas, an example of which is the familiar parabolic "dish" reflector. Short range sensors often employ solid state microwave oscillators, such as the step-recovery diode or the IMPATT diode, in combination with a horn type radiator. The most inexpensive sensors, intended for use in security systems, often utilize microwave transistor oscillators coupled to very simple antennas such as the omnidirectional $\frac{1}{4}$-wavelength stud or the only slightly more directional $\frac{1}{2}$-wavelength folded dipole antenna. The cost of such sensors can range from many millions of dollars for long range radar sets to about $100 for the simplest intrusion detectors.

Apart from the usual applications in radar and sophisticated burglar alarm systems there are a number of consumer-oriented applications, such as automatic doorbells and automatic light switches, where a microwave proximity sensor would be useful. However, their use in these areas has been very limited to date, due to the comparatively high cost of even the simplest systems and the absence of a sensor having power requirements low enough to permit operation from batteries.

Existing microwave proximity sensors employing transistor oscillators utilize a single $\frac{1}{4}$ to $\frac{1}{2}$ length folded dipole antenna as both transmitting and receiving antennas. An example of a sensor of this type is described in U.S. Pat. No. 4,313,118 granted Jan. 26, 1982, to the Applicant herein. In such sensors, changes in the standing wave patterns surrounding the antenna caused by the approach of a person or object are reflected in changes in the total power requirements of the oscillator. Fluctuations in the power drain of the oscillator larger than a pre-set level are used to trigger external circuits, such as alarms. Such a microwave proximity sensor is satisfactory for its intended use in connection with detection of approaches of persons or objects, primarily for security purposes. In certain applications, however, it has been found desirable to place low limits on the total power drain of the system. The invention described herein responds to that need.

SUMMARY OF THE INVENTION

A microwave proximity sensor system comprises oscillator means having a resonance frequency determining element in the form of folded dipole antenna means, said folded dipole antenna means being adapted to serve as transmitting and receiving antenna means; the microwave proximity sensor system further including capacitor means connected to said oscillator means such that the capacitor means are alternately charged and discharged through said oscillator means by triggering said oscillator means into operation, until the voltage across said oscillator means drops to a selected level such that oscillation ceases and the capacitor means again become charged; negative peak follower means connected to the capacitor means for converting the minimum voltage across the capacitor means into DC voltage; and comparator means connected to the negative peak follower means for detecting changes in the output voltage of the peak follower means caused by the approach of a person or object to the antenna means.

Because the $\frac{1}{2}$-wave antenna serves as both the resonant element and the receiving antenna, changes in the standing wave pattern surrounding the antenna will change the amount of positive feedback within the oscillator. Additionally, no tuning is required to match the oscillator to its antennas.

Power to the oscillator is provided by a capacitor. The capacitor is charged to a predetermined voltage, at which time the oscillator is triggered. The oscillator will discharge the capacitor until such time as the remaining voltage is insufficient to support oscillation. When the oscillator turns off, the capacitor voltage will start rising again. The minimum voltage required for oscillation will be a function of the amount of positive feedback in the oscillator and will therefore be sensitive to changes in the standing wave pattern surrounding the antenna.

The oscillator transistor is not operated in a uniform bias condition. Rather, the transistor is initially biased to insure the onset of oscillation, and then the bias is decreased until oscillation ceases. Changes in the standing wave patterns surrounding the antenna are reflected in the precise level of bias at which oscillation ceases, as opposed to the total power usage of the oscillator as in existing devices; this results in decreased power drain and improved sensitivity.

In the preferred embodiment, the initial DC bias on the transistor is determined by a resistive voltage divider. After commencement of oscillation, the effective bias on the transistor is determined by the collector voltage, which voltage is allowed to drop until oscillation ceases. The voltage at which oscillation stops is proportional to the minimum bias required to sustain oscillation, and changes in the voltage reflect changes in the standing wave pattern caused by the approach of a person or object.

The magnitude of the negative excursions of the voltage across the power supply capacitor will reflect changes in the standing wave pattern caused by the approach of a person or other object to the antenna. The negative excursions may be converted into a voltage by a peak follower circuit and the resultant DC voltage may be fed into a threshold detector. The threshold detector may be connected so as to activate some external circuit, such as an alarm or a light switch, when the magnitude of the change exceeds a preset threshold.

The oscillator draws power only in the short interval during which it discharges the capacitor. The total power drain is thus a function of the size of the capacitor and the frequency at which the oscillator is triggered. In practice the power drain can be made extremely small (less than 100 microwatts) with little deleterious effect on sensitivity.

One of the objects of the invention is to provide a method for constructing a medium to low range microwave proximity sensor with a limited number of inexpensive and readily available parts.

A further object is to make it unnecessary for any adjustments to be made on the sensor in order to achieve maximum sensitivity.

A further object is to reduce the power drain of the sensor to a very low level so that it can run for a year or more from a single 9-volt transistor radio battery.

BRIEF DESCRIPTION OF THE DRAWINGS

FIG. 3 is an illustration of the waveforms associated with the preferred form of the invention.

DETAILED DESCRIPTION OF THE PREFERRED EMBODIMENT

Figure 1:
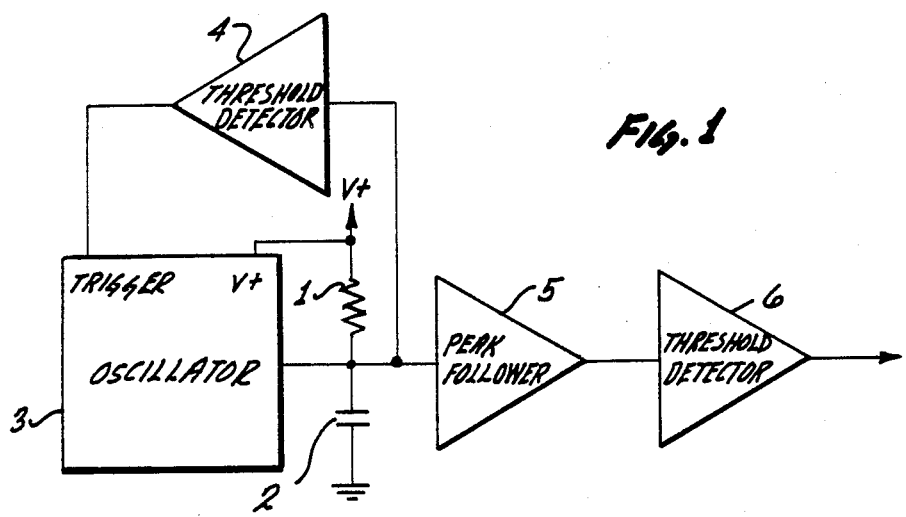
FIG. 1 is a block diagram of the preferred form of the invention.

A block diagram of the invention is shown in FIG. 1. It is comprised of a microwave oscillator 3, in which a ½-wavelength folded dipole antenna serves as the resonant element and the transmitting and receiving antennas, power supply capacitor 2, charging resistor 1, two voltage-sensitive threshold detectors 4 and 6 and a peak follower circuit 5.

When the sensor is turned on, capacitor 2 charges through resistor 1. When the voltage across the capacitor reaches a preset value threshold detector 4 triggers the oscillator. The oscillator 3 discharges the capacitor 2 until the voltage is too low to support oscillation, at which point the oscillator 3 cuts off and the capacitor begins charging again. The voltage across the capacitor 2 will therefore resemble a sawtooth wave, with the positive peak set by threshold detector 4, the negative peak by the voltage cut-off of the oscillator 3 and the frequency by the time constant of resistor 1 and capacitor 2.

The peak follower 5 produces a DC voltage corresponding to the negative peak of the sawtooth. Threshold detector 6 responds to deviations of this voltage from an arbitrary norm caused by the approach of a person or object to the oscillator. The output of the threshold detector can be used to trigger an external circuit such as an alarm or light switch.

Figure 2:
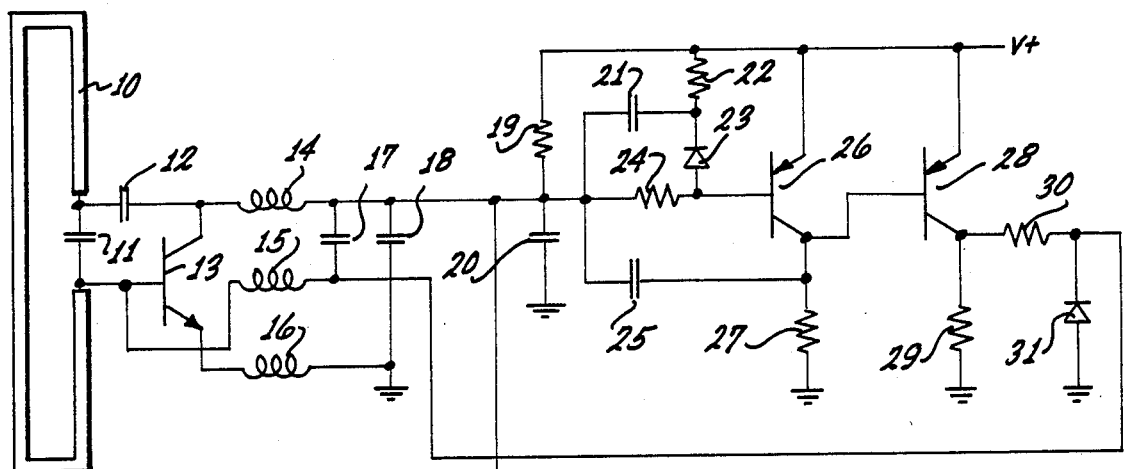
FIG. 2 is a schematic diagram of the preferred form of the invention.
Figure 2:
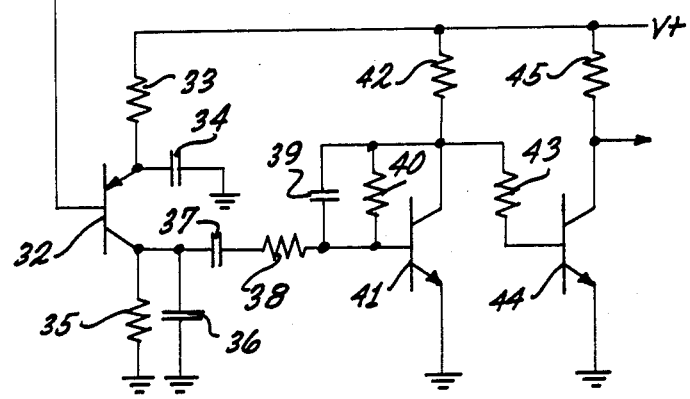

A schematic diagram of the preferred form of the invention is shown in FIG. 2. The system is comprised of microwave transistor 13, ½-wavelength folded dipole antenna 10 and capacitors 11 and 12. Inductors 14, 15 and 16 and capacitors 17 and 18 form a low pass filter to isolate the oscillator from the rest of the circuitry and prevent wires and components from acting as part of the microwave circuit. The dimensions of antenna 10 are chosen to give an operating frequency between 3 and 4 Ghz.

A capacitor 20 functions as the power supply capacitor shown in the block diagram and a resistor 19 functions as the charging resistor. Transistors 26 and 28 form the trigger threshold detector, a transistor 32 is connected as a negative peak follower with gain, a transistor 41 is connected as an amplifier and a transistor 44 is connected as a comparator.

The circuit operates as follows.

Transistor 13 is connected as a lumped-constant grounded collector oscillator, with antenna 10 functioning as the resonant element. Capacitor 12 provides the ground return for antenna 10 and capacitor 11 loads the antenna to prevent oscillation at the ¼-wavelength frequency (the impedance of a ¼-wavelength folded dipole is much larger than that of a ½-wavelength folded dipole, placing a reactive load across the antenna forces oscillation to take place at the ½-wavelength frequency).

Inductors 14, 15 and 16 isolate the oscillator from the rest of the circuitry and capacitors 17 and 18 function as by-pass capacitors. The positive voltage connection of the oscillator is connected to power-supply capacitor 20.

When the sensor is initially turned on, transistor 13 will be off and capacitor 20 will begin charging through resistor 19. Current will flow through resistor 24 and through the base of transistor 26, turning it on. This turns transistor 28 off so that no current flows through resistors 29 or 30, resulting in a base voltage of zero for transistor 13 which keeps it turned off.

When the voltage across capacitor 20 rises to within approximately 0.6 volts of the positive supply voltage transistor 26 will turn off, causing transistor 28 to turn on. This applies a positive bias to the oscillator transistor 13 through resistor 30.

As soon as transistor 13 begins to oscillate it draws a large current from capacitor 20, causing it to discharge rapidly. As discharge begins capacitor 25 supplies additional base drive to transistor 28, ensuring that it is completely turned on. This in turn applies maximum forward bias to transistor 13 and ensures that it is oscillating in the correct, fundamental mode.

After the voltage across capacitor 20 has dropped to approximately 1.5 volts below the positive power supply voltage, diode 23 becomes forward-biased and a large current is driven through the base of transistor 26, via capacitor 21 and diode 23.

This causes transistor 26 to turn on very rapidly, shorting out the base of transistor 28 and removing the positive bias from oscillator transistor 13. Because of the large microwave signal at the emitter of transistor 13, the base will tend to go negative until it is clamped at about −0.6 volts by diode 31.

Transistor 13 will continue to oscillate and discharge capacitor 20 until the voltage across capacitor 20 is too low to support oscillation. At this point oscillation ceases and capacitor 20 begins to charge through resistor 19.

Thus, the oscillator transistor is not operated in a uniform bias condition. The transistor is initially biased to insure the initiation of oscillation with bias, then decreased until oscillation ceases. Changes in the standing wave pattern surrounding the antenna are reflected in the exact level of bias at which oscillation ceases, rather than in the total power drain of the oscillator as in existing devices. Because changes in the standing wave pattern are detected when the oscillator is critically biased, very small changes in the pattern can result in large changes in the amount of bias required for oscillation. Sensitivity of this system is therefore substantially larger than that of existing devices.

Because the resonant element of the oscillator (antenna 10) also functions as the transmitting and receiving antennas, the exact voltage at which oscillation ceases will be a function of the standing wave pattern surrounding the antenna, which in turn will be altered by the approach of a person or object to the antenna.

It will be seen that it is necessary that the base bias for the oscillator be removed before the critical voltage is reached. If transistor 13 is forward-biased capacitor 13 will continue to discharge after oscillation has stopped. It is also necessary that the full base bias be applied to initiate oscillation in the correct mode. Capacitors 21 and 25 and their associated components provide that both of these criteria are met. The waveforms associated with the operation of the trigger threshold detector are shown in FIG. 3.

The voltage across capacitor 20 is fed into the base of transistor 32, which is connected as a negative peak follower with gain. The DC operating points are set by resistors 33 and 35. The low frequency gain is set by capacitor 34 and the high frequency roll-off is set by capacitor 36.

The output of the peak follower is AC-coupled through capacitor 37 to transistor 41, which is connected as an amplifier. The gain of the amplifier is set by resistors 38 and 40, while the high frequency roll-off is set by capacitor 39.

The output of the amplifier is coupled through resistor 43 to transistor 44, which functions as a comparator. The value of resistor 43 is chosen so that in the absence of any AC output signal from transistor 41, transistor 44 is driven into saturation and its output voltage is low. In the presence of an AC output from transistor 41, transistor 44 will turn off when the output of transistor 41 goes sufficiently low and will allow the output to go high, thereby triggering any external circuits. The exact magnitude of the signal required to turn transistor 44 off will be determined by the values of resistors 40, 42, 43 and 45.

It will be seen that the total power consumption of the circuit will be equal to the sum of the current consumed by transistors 26, 32, 41 and 44, all of which are on most of the time, and the current flowing through resistor 19, which ultimately powers the microwave oscillator. The nature of the circuitry is such that with the choice of appropriate low current transistors the collector currents of transistors 26, 32, 41 and 44 may be reduced to a few micro-amperes each. The current drawn through resistor 19 depends entirely on the frequency of operation selected. Since human beings generally move no faster than 10 feet per second the operating frequency may be as low as 500 hz. This allows the current consumption to be under 10 micro-amperes. Total current consumption may be kept under 20 micro-amperes, which amounts to a power drain of 180 microwatts from a 9-volt source. At this rate an alkaline transistor radio battery could power the sensor for a year or more.

From the foregoing, those skilled in the art will readily understand the nature of the invention, the manner in which the method is executed, and the manner in which all the objects set forth are achieved and realized.

The foregoing disclosure is representative of the preferred form of the invention and is to be interpreted in an illustrative rather than a limiting sense, the invention to be accorded the full scope of the claims appended hereto.

What is claimed is:

1. A microwave proximity sensor system comprising:
   oscillator means having a resonance frequency determining element in the form of folded dipole antenna means, said folded dipole antenna means being adapted to serve as transmitting and receiving antenna means;
   capacitor means connected to said oscillator means such that the capacitor means are alternately chargeable and dischargeable through said oscillator means by triggering said oscillator means into operation, until the voltage across said oscillator means drops to a selected level such that oscillation ceases and the capacitor means again can become charged;
   negative peak follower means connected to the capacitor means for converting the minimum voltage across the capacitor means into DC voltage; and
   comparator means connected to the negative peak follower means for detecting changes in the output voltage of the negative peak follower means caused by the approach of a person or object to the antenna means.

2. The invention as set forth in claim 1 wherein said oscillator means comprises transistor means of a lumped constant type, wherein one terminal of said dipole antenna means is connected to the base of said transistor means, and wherein oscillation is maintained by the parasitic emitter-base capacitance of said transistor means.

3. The invention as set forth in claim 2 wherein the length of said dipole antenna means is substantially equal to one-half of the wavelength of the selected operating frequency.

4. The invention as set forth in claim 2 wherein triggering of oscillation is accomplished by the application of a pulse forwardly biasing the base of said transistor whereby oscillation is initiated, the duration of said pulse being shorter than the time to discharge the capacitor to a point at which oscillation ceases.

5. A method for detecting the movement of a person or object comprising the steps of:
   providing oscillator means having a resonance frequency determining element in the form of folded dipole antenna means, said folded dipole antenna means being adapted to serve as transmitting and receiving antenna means;
   providing capacitor means connected to said oscillator means such that said capacitor means are chargeable and dischargeable through said oscillator means;
   charging said capacitor to a predetermined voltage;
   triggering said oscillator means into oscillation when said predetermined voltage has been reached;
   discharging said capacitor means until oscillation of said oscillator means ceases;
   charging said capacitor means after cessation of oscillation by said oscillator means; and
   detecting changes in the minimum voltage across the capacitor caused by the approach of a person or object to the antenna means.

6. The method as set forth in claim 5 wherein said oscillator means comprises transistor oscillator means of the lumped constant type having one terminal of a dipole connected to the base of the transistor means of said transistor oscillator means, oscillation being maintained by the parasitic emitter-base capacitance of said transistor means, and further including the step of triggering said oscillator means by generating a pulse to forward bias the base of said transistor means, the duration of said pulse being shorter than the time it takes the oscillator means to discharge said capacitor means to a point at which oscillation ceases.

7. The method as set forth in claim 5 wherein said step of detecting the movement of a person or object relative to said antenna means comprises the steps of transmitting the voltage across said capacitor means to negative peak follower means generating a DC voltge proportional to the minimum voltage across the capacitor means and transmitting the output of said peak follower means to comparator means which is responsive to changes in the voltage exceeding a preset level to actuate an external signal circuit wherein such a change in said voltage takes place.

* * * * *